Figure 3:
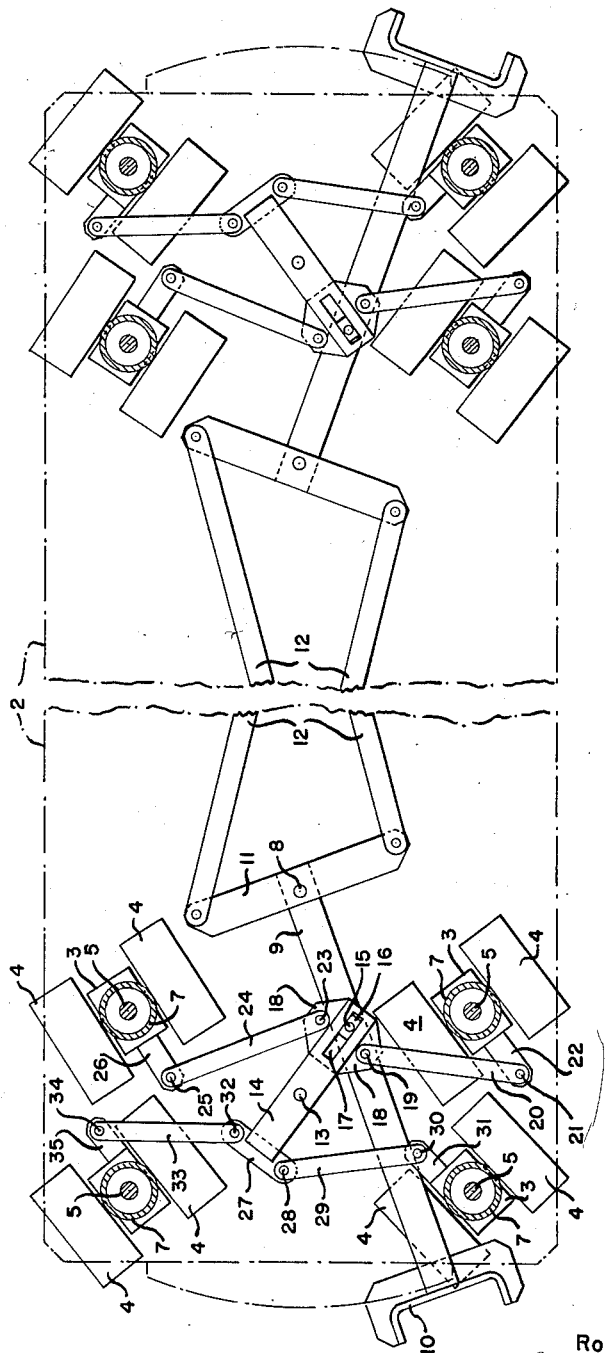

Dec. 17, 1957   R. G. MILLER   2,816,773
TRAILER STEERING MECHANISM
Filed May 18, 1956   2 Sheets-Sheet 1
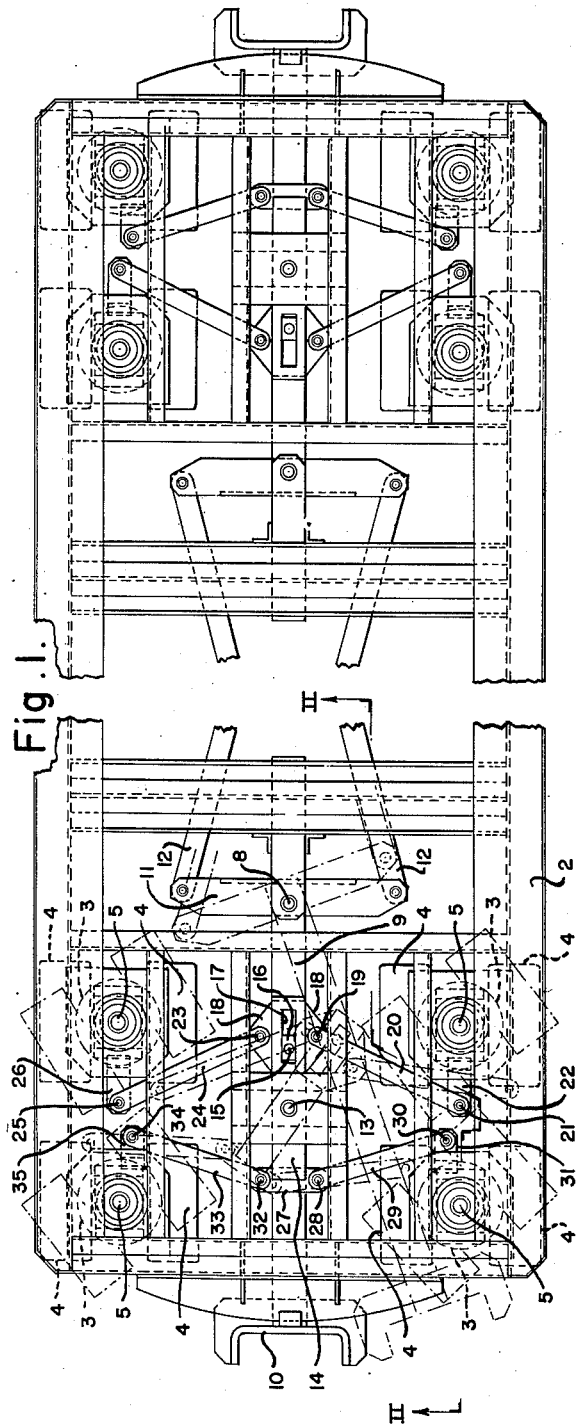
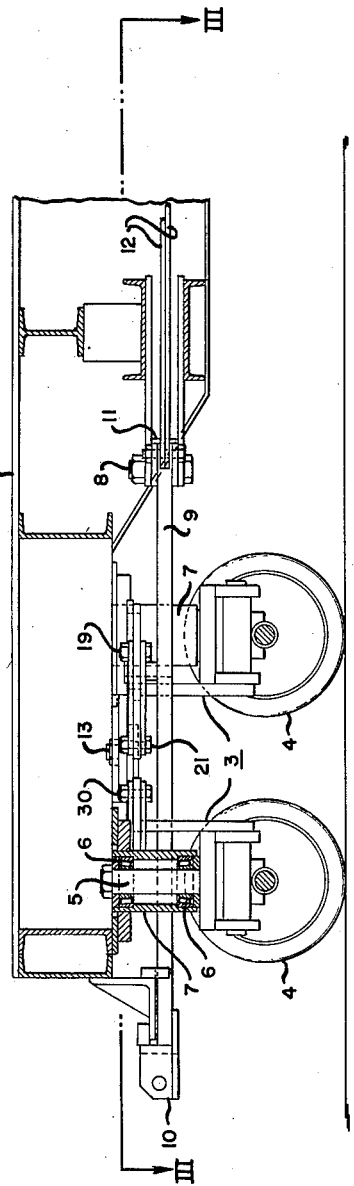
INVENTOR
Robert G. Miller Dec. 17, 1957  R. G. MILLER  2,816,773
TRAILER STEERING MECHANISM Filed May 18, 1956  2 Sheets-Sheet 2

INVENTOR
Robert G. Miller
By Hooply Leonard & Buell
his attorneys

United States Patent Office 2,816,773
Patented Dec. 17, 1957

2,816,773

TRAILER STEERING MECHANISM

Robert G. Miller, Castle Shannon, Pa., assignor to Salem-Brosius, Inc., Pittsburgh, Pa., a corporation of Pennsylvania Application May 18, 1956, Serial No. 585,698

4 Claims. (Cl. 280—103)

This invention relates to trailer steering mechanism, particularly steering mechanism for trailers having at least two pairs of separate wheel mounting structures with the pairs of such structures spaced apart generally longitudinally of the body and the wheel mounting structures of each pair spaced apart generally transversely of the body. The invention has to do with steering mechanism for such trailers which simultaneously turns the respective separate wheel mounting structures so that when the trailer is steered to move in a curved path each wheel mounting structure is disposed at substantially the optimum angle for movement in such path.

For purposes of explanation and illustration the invention will be described as embodied in steering mechanism for a trailer having four pairs of separate wheel mounting structures, two pairs adjacent each end of the body, the pairs adjacent each end of the body being spaced apart generally longitudinally of the body, the wheel mounting structures of each pair being spaced apart generally transversely of the body, and each of the wheel mounting structures being connected with the body for turning movement relatively to the body about a generally vertical axis, there being at least one wheel mounted in each of the wheel mounting structures. I may provide steering mechanism for the wheel mounting structures adjacent an end of the body, similar steering mechanism for the wheel mounting structures adjacent the opposite end of the body and connecting means connecting together those steering mechanisms to function in unison so that each of the wheel mounting structures will be turned at substantially the optimum angle for movement of the trailer along the desired path.

The invention may be employed in a trailer having two pairs of separate wheel mounting structures adjacent one end of the body and steering mechanism for controlling such wheel mounting structures without necessarily similarly controlling wheel mounting structures adjacent the opposite end of the body although for optimum results all of the wheel mounting structures of the trailer ought to be controlled by the steering mechanism.

I provide, in a trailer having a body, two pairs of separate wheel mounting structures, the pairs being spaced apart generally longitudinally of the body, the wheel mounting structures of each pair being spaced apart generally transversely of the body, each of the wheel mounting structures being connected with the body for turning movement relatively to the body about a generally vertical axis, and at least one wheel mounted in each of the wheel mounting structures, a first lever connected with the body for turning movement relatively thereto in a generally horizontal plane, the first lever extending generally between the axes of the wheel mounting structures of each pair of transversely spaced wheel mounting structures, a second lever pivoted to the body and having a sliding connection with the first lever so that turning of the first lever causes turning of the second lever and link means connecting the second lever to each of the four wheel mounting structures to turn those structures upon turning of the second lever. I preferably employ a tongue at an end of the body connected with the body at a location more remote from the aforementioned end of the body than the axes of the wheel mounting structures adjacent that end of the body and having its extremity projecting beyond said end of the body, the tongue being connected with the body for turning movement relatively thereto in a generally horizontal plane, a lever pivoted to the body and having a sliding connection with the tongue so that turning of the tongue causes turning of the lever and link means connecting the lever to each of the four wheel mounting structures to turn those structures upon turning of the lever. The lever is preferably pivoted intermediate its ends to the body and has in one direction from the pivot the aforementioned sliding connection with the tongue, and link means are preferably pivoted to the lever in one direction from the pivotal connection of the lever to the body and also pivoted to the wheel mounting structures of one of said pairs, and other link means are preferably pivoted to the lever in the opposite direction from the pivotal connection of the lever to the body and also pivoted to the wheel mounting structures of the other of said pairs, the link means turning the wheel mounting structures upon turning of the lever.

The lever preferably is not only pivoted intermediate its ends to the body but also oriented generally longitudinally of the body and preferably has the sliding connection with the tongue at a portion thereof more remote from the aforementioned end of the body than the pivotal connection of the lever to the body. Link means are preferably pivoted to the lever at the portion thereof closer to said end of the body than said pivotal connection and also pivoted to the wheel mounting structures of the pair of wheel mounting structures closer to said end of the body and other link means are preferably pivoted to the lever generally in the region of the sliding connection and also pivoted to the wheel mounting structures of the pair of such structures relatively remote from said end of the body. The axis of the pivotal connection of the lever to the body is preferably in substantially longitudinal alignment with the axis of turning movement of the connection of the tongue with the body and closer to the aforementioned end of the body than the last mentioned axis while the lever is preferably oriented generally longitudinally of the body and has the sliding connection with the tongue at a portion thereof generally intermediate said axes. Link means are preferably provided which are pivoted to the lever in one direction from the pivotal connection of the lever to the body and also pivoted to the wheel mounting structures of one of said pairs and other link means are preferably provided which are pivoted to the lever in the opposite direction from the pivotal connection of the lever to the body and also pivoted to the wheel mounting structures of the other of said pairs.

Other details, objects and advantages of the invention will become apparent as the following description of a present preferred embodiment thereof proceeds.

In the accompanying drawings I have shown a present preferred embodiment of the invention in which—

Figure 1 is a plan view with a portion cut away of a trailer having my steering mechanism applied thereto so as to steer all of the wheel mounting structures thereof;

Figure 2 is a view to enlarged scale partly in elevation and partly in vertical cross section of the structure shown in Figure 1 at one end only of the trailer; and Figure 3 is a horizontal cross-sectional view to the same scale as Figure 1 taken on the line III—III of Figure 2 although showing the entire trailer steering mechanism with the wheels turned but with the central portions of the crossed links 12 cut away as in Figure 1.

Referring now more particularly to the drawings, there is shown a trailer having a body designated generally by reference numeral 2 having connected therewith eight separate wheel mounting structures each of which is designated generally by reference numeral 3. The wheel mounting structures are arranged in pairs, two pairs adjacent each end of the body 2. The pairs of wheel mounting structures adjacent each end of the body are spaced apart generally longitudinally of the body. The wheel mounting structures of each pair are spaced apart generally transversely of the body or in other words are in transverse alignment.

I have purposely not shown in the drawings the details of the wheel mounting structures 3 since except for the means for turning them presently to be described they may be conventional. For purposes of explanation and illustration each of the wheel mounting structures 3 may be considered to be of the well known "fifth wheel" type. It is sufficient for present purposes to say that each of the wheel mounting structures 3 underlies and is connected with the body 2 to turn relatively to the body about a generally vertical axis. In the form of structure shown in the drawings each wheel mounting structure 3 carries two wheels 4 although the number of wheels carried by each wheel mounting structure is not a limitation upon the invention. The eight wheel mounting structures collectively support the body 2 in conventional manner.

While as above stated the wheel mounting structures may be conventional I have shown in a general way in Figure 2 one form in which the wheel mounting structure has a generally vertical post 5 journaled in bearings 6 in a sleeve 7 carried by and projecting downwardly from the body 2.

Pivoted to the body 2 about a vertical pivot 8 at each end of the body is a tongue 9, which is referred to in certain of the claims as a "first lever." Each tongue extends from its pivot 8 generally between the axes of the wheel mounting structures of each pair of transversely spaced wheel mounting structures at the corresponding end of the trailer and has its extremity projecting beyond that end of the body as shown at 10. Each of the tongues 9 has integral therewith at the inner end thereof a cross member 11. The cross members 11 of the respective tongues 9 are interconnected by crossed links 12 so that when the tongue at one end of the trailer turns in a particular direction the tongue at the opposite end of the trailer will turn in the same direction and to the same extent. The remainder of the trailer steering mechanism is duplicated at the respective ends of the trailer and description thereof for one end of the trailer will suffice for both ends.

Pivoted to the trailer by a pivot 13 is a lever 14. The pivots 8 and 13 are shown as having their axes both in the central vertical longitudinal plane of the trailer, the pivot 13 being nearer the adjacent end of the body 2 than the pivot 8. The pivot 13 is in a general sense located substantially centrally among the four posts 5 of the wheel mounting structures adjacent the corresponding end of the trailer.

In their normal positions both the tongue 9 and the lever 14 lie with their center lines generally in the central vertical longitudinal plane of the trailer. The tongue 9 generally underlies the lever 14, and the tongue has projecting upwardly therefrom a pivot member 15 upon which is turnably mounted a block 16 which slides in a guideway 17 in the lever 14 whereby the tongue and lever have a sliding connection with each other. The sliding connection provides for both relative sliding movement and relative turning movement between the tongue and lever, the tongue and lever partaking of both of such relative movements simultaneously.

The means for turning the wheel mounting structures are links each of which is connected at one end with the lever 14 and at the other end with one of the four surrounding wheel mounting structures. At its end adjacent the sliding connection between it and the tongue 9 the lever 14 has oppositely projecting lateral ears 18. To one of the ears 18 is pivoted at 19 a link 20 whose opposite end is pivoted at 21 to a generally horizontally projecting member 22 forming a portion of one of the wheel mounting structures 3 which for purposes of identification I shall call the left rearward wheel mounting structure. To the opposite ear 18 is pivoted at 23 a link 24 whose opposite end is pivoted at 25 to a generally horizontally projecting member 26 forming a portion of the wheel mounting structures 3 which for purposes of identification I shall call the right rearward wheel mounting structure. At its end opposite the end at which the sliding connection with the tongue is disposed the lever 14 has oppositely projecting lateral ears 27. To one of the ears 27 is pivoted at 28 a link 29 whose opposite end is pivoted at 30 to a generally horizontally projecting member 31 forming a portion of one of the wheel mounting structures 3 which for purposes of identification I shall call the left forward wheel mounting structure. To the opposite ear 27 is pivoted at 32 a link 33 whose opposite end is pivoted at 34 to a generally horizontally projecting member 35 forming a portion of one of the wheel mounting structures 3 which for purposes of identification I shall call the right forward wheel mounting structure.

It will be noted that the members 22 and 26 project in a direction which may be termed forwardly while the members 31 and 35 project in the opposite direction which may be termed rearwardly. Thus when the lever 14 turns in the clockwise direction when viewed from above all four of the wheel mounting structures turn in the counterclockwise direction to the angular positions shown in chain lines in Figure 1. The angle through which each wheel mounting structure turns upon predetermined angular movement of the lever 14 may be determined by the position of the projecting member 22, 26, 31 or 35, as the case may be, and the distance between the axis of turning movement of each wheel mounting structure and the pivotal connection thereto of the link which moves it. I preferably proportion and position the respective elements so that upon turning of the lever 14 through a predetermined angle the wheel mounting structures respectively turn through different angles but each to a position in which the extended wheel axle passes through a predetermined point; i. e., all of the extended wheel axles pass through the same point. The effect is movement of the trailer in a desired curved path with a minimum of sliding of the wheels so that a condition of approximate full rolling of each wheel upon the supporting floor is attained.

As is clearly shown in Figure 1, turning of the tongue in one direction about the pivot 8 causes turning of the lever 14 in the opposite direction and turning of the wheel mounting structures as aforesaid. When the tongue moves in the other direction the cooperating members move oppositely.

Each tongue 9 may carry at its extremity any suitable means whereby it may be coupled or otherwise attached to a suitable source of power whereby the trailer is moved and steered. Since the attaching mechanism forms no part of the present invention it will not be described in detail. It is sufficient for present purposes to say that means are shown for attaching the trailer to a conventional truck or tractor of the type commonly used for moving trailers of the type with which the invention is concerned.

While I have shown and described a present preferred embodiment of the invention it is to be distinctly understood that the invention is not limited thereto but may be otherwise variously embodied within the scope of the following claims.

I claim:

1. In a trailer having a body, two pairs of separate wheel mounting structures, the pairs being spaced apart generally longitudinally of the body, the wheel mounting structures of each pair being spaced apart generally transversely of the body, each of the wheel mounting structures being connected with the body for turning movement relatively to the body about a generally vertical axis, and at least one wheel mounted in each of the wheel mounting structures, a tongue at an end of the body connected with the body at a location more remote from said end of the body than the axes of said wheel mounting structures and having its extremity projecting beyond said end of the body, the tongue being connected with the body for turning movement relatively thereto in a generally horizontal plane, a lever pivoted intermediate its ends to the body and having in one direction from the pivot a sliding connection with the tongue so that turning of the tongue causes turning of the lever, link means pivoted to the lever in one direction from the pivotal connection of the lever to the body and also pivoted to the wheel mounting structures of one of said pairs and other link means pivoted to the lever in the opposite direction from the pivotal connection of the lever to the body and also pivoted to the wheel mounting structures of the other of said pairs, the link means turning the wheel mounting structures upon turning of the lever.

2. In a trailer having a body, two pairs of separate wheel mounting structures, the pairs being spaced apart generally longitudinally of the body, the wheel mounting structures of each pair being spaced apart generally transversely of the body, each of the wheel mounting structures being connected with the body for turning movement relatively to the body about a generally vertical axis, and at least one wheel mounted in each of the wheel mounting structures, a tongue at an end of the body connected with the body at a location more remote from said end of the body than the axes of said wheel mounting structures and having its extremity projecting beyond said end of the body, the tongue being connected with the body for turning movement relatively thereto in a generally horizontal plane, a lever pivoted intermediate its ends to the body and oriented generally longitudinally of the body having at a portion thereof more remote from said end of the body than the pivotal connection of the lever to the body a sliding connection with the tongue so that turning of the tongue causes turning of the lever, link means pivoted to the lever at the portion thereof closer to said end of the body than said pivotal connection and also pivoted to the wheel mounting structures of the pair of wheel mounting structures closer to said end of the body and other link means pivoted to the lever generally in the region of said sliding connection and also pivoted to the wheel mounting structures of the pair of such structures relatively remote from said end of the body, the link means turning the wheel mounting srtuctures upon turning of the lever.

3. In a trailer having a body, two pairs of separate wheel mounting structures, the pairs being spaced apart generally longitudinally of the body, the wheel mounting structures of each pair being spaced apart generally transversely of the body, each of the wheel mounting structures being connected with the body for turning movement relatively to the body about a generally vertical axis, and at least one wheel mounted in each of the wheel mounting structures, a tongue at an end of the body connected with the body at a location more remote from said end of the body than the axes of said wheel mounting structures and having its extremity projecting beyond said end of the body, the tongue being connected with the body for turning movement relatively thereto in a generally horizontal plane, a lever pivoted intermediate its ends to the body, the axis of the pivotal connection of the lever to the body being in substantially longitudinal alignment with the axis of turning movement of the connection of the tongue with the body and closer to said end of the body than said last mentioned axis, the lever being oriented generally longitudinally of the body and having at a portion thereof generally intermediate said axes a sliding connection with the tongue so that turning of the tongue causes turning of the lever, link means pivoted to the lever in one direction from the pivotal connection of the lever to the body and also pivoted to the wheel mounting structures of one of said pairs and other link means pivoted to the lever in the opposite direction from the pivotal connection of the lever to the body and also pivoted to the wheel mounting structures of the other of said pairs, the link means turning the wheel mounting structures upon turning of the lever.

4. In a trailer having a body, four pairs of separate wheel mounting structures, two pairs adjacent each end of the body, the pairs adjacent each end of the body being spaced apart generally longitudinally of the body, the wheel mounting structures of each pair being spaced apart generally transversely of the body, each of the wheel mounting structures being connected with the body for turning movement relatively to the body about a generally vertical axis, and at least one wheel mounted in each of the wheel mounting structures, a tongue at an end of the body connected with the body at a location more remote from said end of the body than the axes of the wheel mounting structures adjacent said end of the body and having its extremity projecting beyond said end of the body, the tongue being connected with the body for turning movement relatively thereto in a generally horizontal plane, a lever pivoted to the body and having a sliding connection with the tongue so that turning of the tongue causes turning of the lever, link means connecting the lever to each of the four wheel mounting structures adjacent said end of the body to turn those structures upon turning of the lever, correspondingly positioned and connected tongue, lever and link means at the opposite end of the body and connections between the two tongues so that all eight of the wheel mounting structures are turned upon turning of the first mentioned tongue, said connections being separate from said levers.

References Cited in the file of this patent

UNITED STATES PATENTS

| | | |
|---|---|---|
| 624,264 | Thomas | May 2, 1899 |
| 1,380,119 | Sponsel | May 31, 1921 |
| 2,431,626 | Townsend | Nov. 25, 1947 |

FOREIGN PATENTS

| | | |
|---|---|---|
| 723,727 | Germany | Aug. 10, 1942 |